United States Patent

[11] 3,598,029

| | | | |
|---|---|---|---|
| [72] | Inventor | Michel Paramythioti Chantilly, France | |
| [21] | Appl. No. | 846,667 | |
| [22] | Filed | Aug. 1, 1969 | |
| [45] | Patented | Aug. 10, 1971 | |
| [73] | Assignee | Albaret S. A. Rantigny, France | |
| [32] | Priority | Aug. 12, 1968 | |
| [33] | | France | |
| [31] | | 162,659 | |

[54] VIBRATORY MACHINE, ESPECIALLY INTENDED FOR COMPACTING GROUND
8 Claims, 11 Drawing Figs.

[52] U.S. Cl.................................................. 94/50,
74/87, 94/48
[51] Int. Cl.......................................................... E01c 19/28
[50] Field of Search............................................ 74/61, 87;
94/48, 50

[56] References Cited
UNITED STATES PATENTS
| | | | |
|---|---|---|---|
| 2,989,869 | 6/1961 | Hanggi.......................... | 74/87 X |
| 3,097,537 | 6/1963 | Peterson....................... | 74/61 |

FOREIGN PATENTS
| | | | |
|---|---|---|---|
| 531,184 | 9/1954 | Belgium ........................ | 94/48 |

Primary Examiner—Jacob L. Nackenoff
Attorney—Young & Thompson

ABSTRACT: A vibratory machine, especially intended for compacting ground, comprising a vibrating body subjected to the action of a rotating vibrator shaft carrying two eccentric flyweights, one of which is fixed for rotation on said vibrator shaft while the other is free for rotation thereon, the effects of said flyweights over a determined range of frequencies have a geometric resultant which varies in a continuous manner as a function of the speed of rotation, and irrespective of the direction of rotation. The vibratory machine is associated with a chassis adapted for coupling to the machine by suspension and isolating means, the weight of the chassis carried by the machine being at least of the same order as that of said machine.

INVENTOR
MICHEL PARAMYTHIOTI
BY Young + Thompson
ATTYS.

VIBRATORY MACHINE, ESPECIALLY INTENDED FOR COMPACTING GROUND

The present invention relates to vibratory machines, and more particularly to vibratory machines utilized for compacting the ground; it may also relate to devices permitting the measurement of certain characteristics of the ground, and in particular the natural frequency of resonance of this latter. It may also relate to any kind of hammering machine for driving any kind of member into any kind of material, for example for driving sheetpiling into the ground.

In the case of a compacting machine, the invention is more particularly directed to vibratory machines of the kind comprising a drum subjected to the action of an unbalanced shaft rotatably mounted in bearings fixed on the said drum and also to vibrating vehicles bearing on the ground by at least one vibratory machine of this type.

In the text which follows, the drum will be more generally known as the "vibrating body," and the unbalanced shaft is termed "vibrator shaft," the term "vibratory machine" designating the combination of these two devices.

Thus, a vibrator shaft is a shaft carrying an eccentric flyweight keyed on it for rotation; in operation, this flyweight is the seat of a centrifugal force which is applied to the vibrator shaft and which is transmitted thereby to the vibrating body, through the intermediary of the bearings in which it rotates.

This centrifugal force, hereinafter represented by $F$, is of the form:

$$F = m\, a\, \omega^2$$

in which equation:
- $m$ is the mass of the eccentric flyweight,
- $a$ is the eccentricity of this weight,
- $\omega$ represents the speed of rotation of the vibrator shaft.

The centrifugal force $F$ thus varies as the square of the speed of rotation of the vibrator shaft, which speed furthermore determines the frequency of the compacting impulses applied to the ground by the vibrating body.

Now, it has been found that it is desirable to be able to vary this frequency; it is in fact generally admitted that it is preferable to carry out the compacting of ground by effecting a number of passes carried out with compacting frequencies which progressively increase from one pass to the other and which are preferably slightly higher than the natural frequency of resonance of the ground. As the frequency of resonance varies from one type of ground to another, it is desirable to be able to vary the compacting frequency so as to permit the best adaptation of a vibratory machine to different types of ground.

However, as shown by the above equation, a variation of this frequency, that is to say a variation of the speed of rotation of the vibrator shaft, results in a much more rapid variation of the centrifugal force $F$, and therefore of the effectiveness of the machine.

This has a twofold consequence: on the one hand attempts to obtain high frequencies are very rapidly limited by the resistance of the bearings which have to absorb and transmit the effects of a centrifugal force $F$ which is increasing much more rapidly; and on the other hand, attempts to obtain low frequencies result in such a diminution of the force $F$ that this latter becomes ineffective.

It is therefore desirable that, over a chosen range of variation of speed corresponding to normal frequencies of use, in a range extending for example from 0.8 to 1.5 times the basic frequency, the product $m \cdot a$ should vary in a continuous manner with the speed of rotation of the vibrator shaft and in opposite sense, so that the force $F$ will remain as constant as possible, thus permitting the maximum exploitation of the potential of mechanical performance of the equipment over a wide range of speeds.

To this end, it has already been proposed to produce a composite out-of-balance weight, constituted for example by a flyweight mounted movably radially against the action of a spring in opposition to the main out-of-balance weight. At low speeds of rotation, the flyweight is held as close as possible to the vibrator shaft, and at high speeds of rotation it moves away from the said shaft. In practice, this arrangement causes great difficulties when it is applied to unbalanced forces of large magnitude, the problem of the springs then becoming very difficult to solve by reason of the forces involved.

It has also been proposed to provide the association with a first unbalanced weight of a second unbalanced weight which is capable of rotation between two stops, and in which the effects are additive to or subtracted from those of the first, depending on the direction of rotation of the shaft on which they are carried. In this case however, there are only available two discrete values of the amplitude of the vibration, without continuous variation between these values.

The present invention has for its object a vibratory machine which is free from these disadvantages and which compiles in a more satisfactory manner with the conditions specified above.

According to the invention, a vibratory machine of the kind comprising a vibrating body subjected to the action of a rotating shaft, known as the vibrator shaft, and carrying a flyweight keyed thereon for rotation, is characterized in that, with this first eccentric flyweight is associated a second eccentric flyweight free for rotation on the said vibrator shaft, the geometric resultant of the effects of the two flyweights varying in a continuous manner as a function of the speed of rotation, irrespective of the direction of this rotation.

Theoretical calculations have shown, and practical tests have confirmed that when certain precautions are taken, the free flyweight takes up in operation an angular predetermined position between two extreme positions, one corresponding to zero speed of rotation—and the two flyweights come into phase and their effects are additive—the other to an infinite speed of rotation—the two flyweights coming into phase opposition and their effects being differential.

Between these two extreme positions, the two flyweights geometrically compose their effects, so that the resultant of these decreases from a maximum to a minimum when the speed of rotation passes from zero to a maximum speed.

Conjointly, as desired, the centrifugal force $F$ and therefore the load on the bearings vary only slightly over a determined range of frequencies.

Preferably but not necessarily, the bearing which carries the free flyweight is itself mounted with a slight eccentricity on the vibrator shaft.

This arrangement makes it possible to displace the range of useful frequencies advantageously in the direction of high frequencies, and thereby to bracket better the natural frequency of resonance of the ground.

Reference has been made above to certain precautions which must be taken. The applicants have in fact discovered —and this is an important aspect of the present invention— that it was advantageous, in order to obtain the best result from a vibratory machine and especially from a vibratory machine according to the invention, to ensure a coupling which is as prolonged as possible between this vibratory machine and the material which it treats. For example, in the case of a machine for compacting the ground, it is advantageous during the course of each cycle of vibration that there should not be any too prolonged loss of contact between the vibratory machine and the ground.

To achieve this, and according to the invention, there is associated with the vibratory machine a frame which is coupled to it by suspension and isolating means, and the weight of which on the vibratory machine is at least of the same order as the weight of this machine.

For a better appreciation of the original nature of this arrangement, it should be stated that in the vibratory machines known at the present time, the frame associated with such a machine applies to this latter a weight which most frequently is of the order of one-tenth of the weight of the said vibratory machine.

The characteristic features and advantages of the invention will be further brought out in the description which follows below, given by way of example, with reference to the accompanying drawings, in which.

Figure 2:
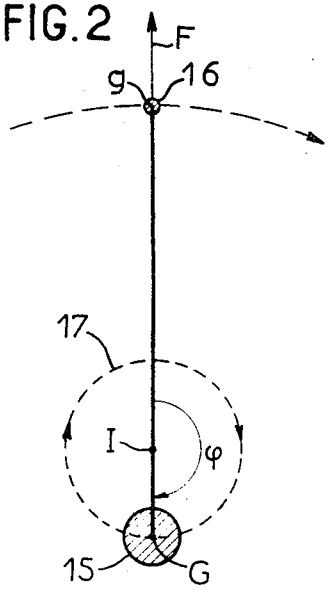
FIG. 2 is a theoretical representation of a vibratory machine which is assumed to be free in space.
Figure 3:
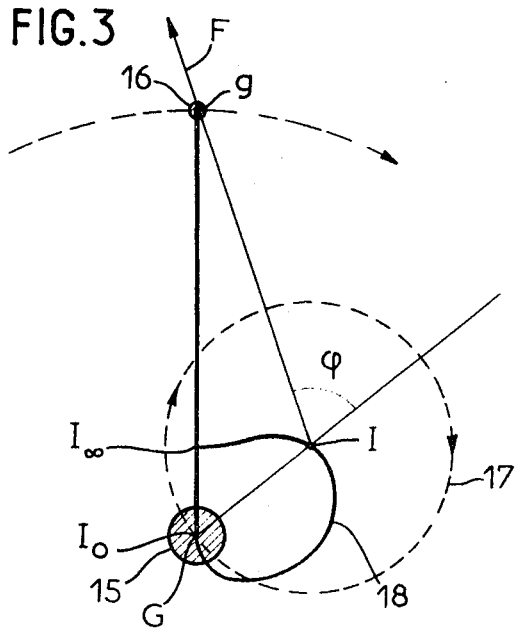
Figure 4:
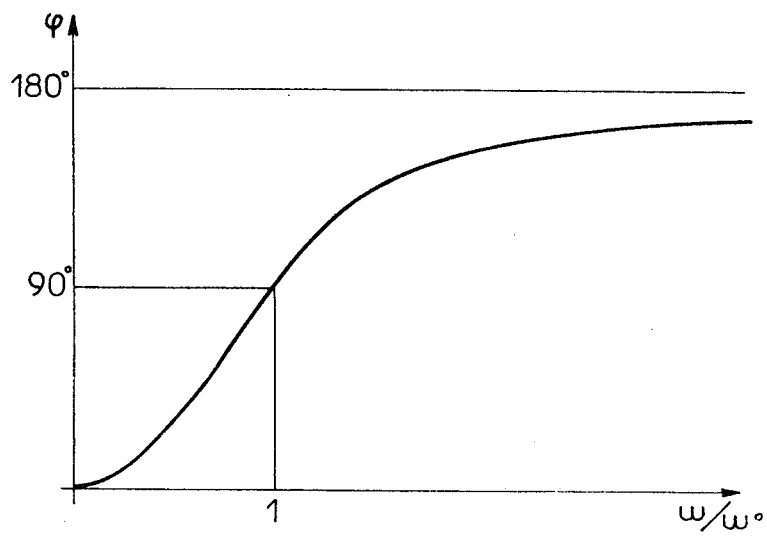
Figure 1:
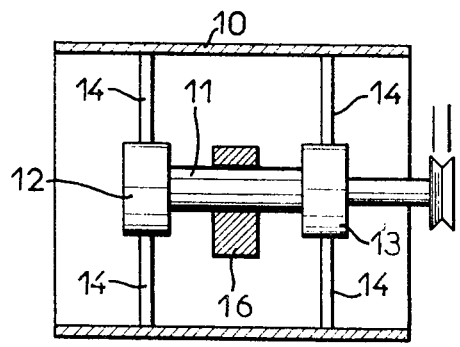
FIG. 1 is a diagrammatic view of a vibratory machine of the usual type.
Figure 5:
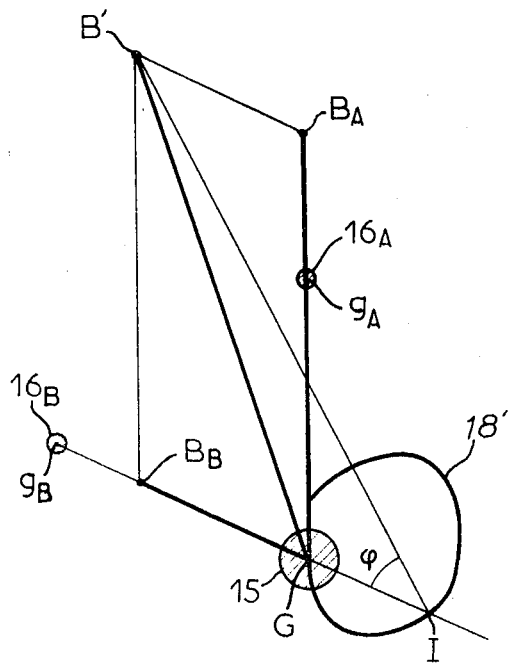
Figure 6:
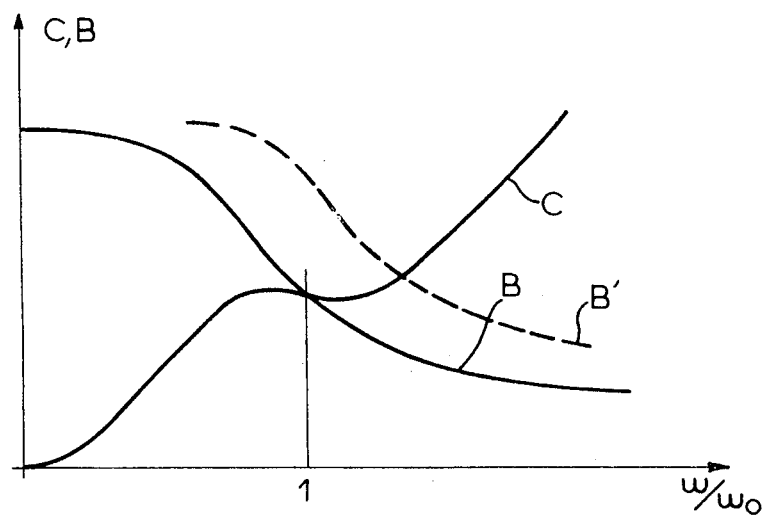
Figure 7:
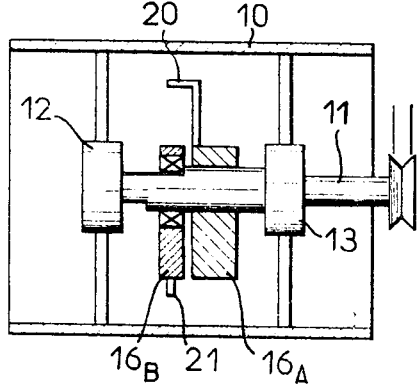
Figure 8:
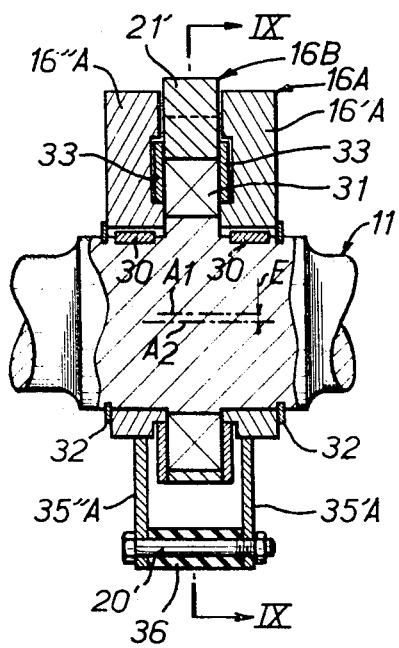
Figure 9:
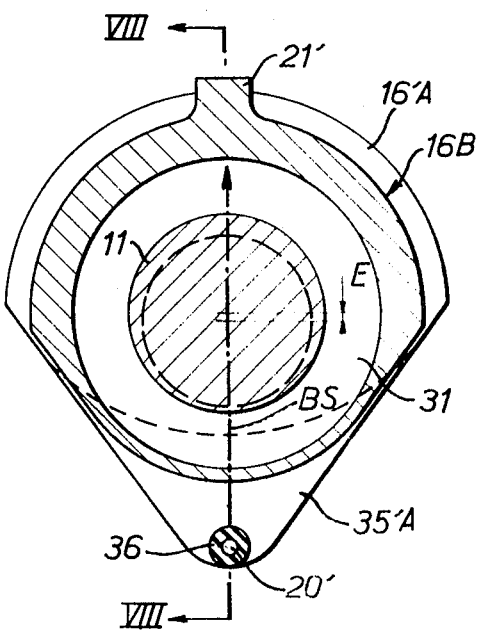
Figure 10:
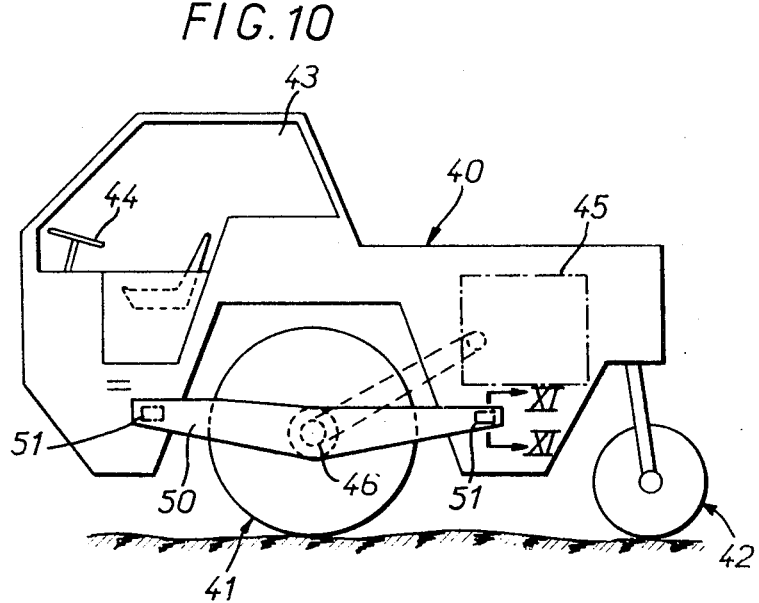
Figure 11:
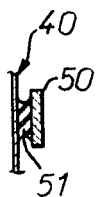

FIG. 3 similar to FIG. 2, with the vibratory machine bearing on the ground;

FIG. 4 is a diagram corresponding to one of the working characteristics of this vibratory machine;

FIG. 5 is similar to FIG. 3 and relates to a vibratory machine according to the invention;

FIG. 6 is a diagram illustrating the results obtained by this vibratory machine;

FIG. 7 is similar to FIG. 1, and relates to a vibratory machine according to the invention;

FIG. 8 is a view in cross section, taken along the line VIII-VIII of FIG. 9 of a practical construction of the eccentric flyweights according to the invention;

FIG. 9 is another view in cross section of the flyweights, taken along the line IX-IX of FIG. 8;

FIG. 10 is a diagrammatic view in elevation of a vibrating vehicle which utilizes a vibratory machine according to the invention;

FIG. 11 is a view in detail cross section, taken along the line XI-XI of FIG. 10.

These drawings relate to a vibratory machine comprising a compacting drum 10 and a rotatably mounted shaft 11, under the control of a driving device of any kind, in the bearings 12, 13 carried axially by the drum 10, by arms or end plates 14. The shaft 11 carries an eccentric flyweight 16 acting as an out-of-balance weight.

A vibratory machine of this kind has only been shown diagrammatically in FIG. 1, since its structure is well known per se.

With regard to FIG. 2 to 4, these are geometrical views intended to illustrate the description which follows below.

In these figures, the whole weight of the drum 10 and of the members which are coupled to it, especially the shaft 11, is assumed to be concentrated at the center of gravity G of the system thus formed. This weight M is shown diagrammatically by a shaded circle 15.

Similarly, at 16 there is shown the mass $m$ of the eccentric flyweight carried by the shaft 11, this mass being assumed to be concentrated at the center of gravity $g$ of the said flyweight.

In FIG. 2, the vibratory machine is assumed to be isolated in space, that is to say without contact with the ground. As is well known, when the vibrator shaft carrying the flyweight $m$ rotates about its axis, everything takes place as if the mass $M$ and the flyweight $m$ both rotated about a point $I$ fixed in space, known as the center of rotation, which in the present case is coincident with the center of gravity of the system. If $a$ represents the eccentricity of the flyweight $m$, that is to say the distance $\overline{Gg}$:

$$\overline{IG}/\overline{Ig} = m/M \cdot a$$

The mass M describes a circle 17 about the point I, and $\overline{IG}$ thus represents the amplitude of the displacement imparted to the mass M with respect to the point I, in response to the centrifugal force F to which the flyweight $m$ is subjected.

The directions $\overline{IG}$ (displacement) and $\overline{Ig}$ (force) form an angle of 180° between them; they are therefore in phase opposition.

These conditions are no longer the same when the vibratory machine is placed on the ground. In fact, the ground intervenes due to its response characteristics and in particular to its natural frequency of resonance, which corresponds to a speed of rotation $\omega_o$ of the vibrator shaft, and its damping factor $s$ which in general varies between 0.2 and 0.7.

In this case (FIG. 3) the center of rotation I no longer coincides with the common center of gravity of the masses M and $m$, but forms, with the points G and $g$, a triangle which rotates about the point I. As $\overline{IG}$ is very small as compared with $\overline{Ig}$ and $\overline{Gg}$, these two directions will form a very small angle between them and may be considered as parallel.

For a given speed of rotation, the point I is fixed in space, and the triangle $\overline{IGg}$ remains indeformable.

On the other hand, if $\omega$ varies from 0 to infinity, the center of rotation is displaced with respect to G and $g$ along a curve which has the form of that shown at 18 in FIG. 3.

A curve such as 18 will of course be obtained for each value of $s$. The curves 18 all have two common points: a point $I_o$, coincident with the point G and corresponding, when $\omega$ is zero, to the position of rest of the system; and a point $I_\infty$ which corresponds, when $\omega$ is infinity, to the limiting theoretical case represented in FIG. 2:

$$\overline{I_oG} = m/M \cdot a$$

As can be seen from the curve 18, to a value of $\omega$ there corresponds a position of the center of rotation $I$, and for this position, the amplitude $\overline{IG}$ of the displacement of the mass 15 with respect to the fixed point I, and therefore to the ground, has a definite value A which varies from $m/M \cdot a$ to 0 when $\omega$ varies from 0 to infinity, generally passing through a maximum for the resonance ($\omega = \omega_o$).

Conjointly, phase shift $\Phi$ between the directions $\overline{IG}$ (displacement) and $\overline{Ig}$ (force) varies from 0 to 180° when $\omega$ varies from 0 to infinity (FIG. 4).

It is on the existence of this phase shift that the present invention is based, and this will be better understood by referring now to FIG. 5.

According to the invention, and as shown in this FIG. 5, with a first flyweight 16A keyed for rotation on the vibrator shaft, is associated a second flyweight 16B freely mounted for rotation on the said vibrator shaft; their centers of gravity are respectively $g_A$ and $g_B$.

As previously, at a given speed $\omega$, the center of rotation I takes up a definite position on a curve 18' of the same type as the curve 18 previously described. As the flyweight 16B is free on the vibrator shaft, no driving torque can be transmitted to it and, in consequence, when once started up it is automatically aligned with the center of rotation I, its phase shift $\overline{IG}$, $\overline{Ig_B}$ being zero.

In the description which follows, there will be represented by the unbalance B the product $m \cdot a$ of the mass of a flyweight and its eccentricity; the centrifugal force is therefore equal to $B \omega^2$.

The unbalances $B_A$ and $B_B$ of the flyweights $16_A$, $16_B$ compose their effect geometrically, as has been shown diagrammatically in FIG. 5, and are therefore equivalent to a single unbalance in which the representative point B' would form the fourth corner of a parallelogram having as its other corners $B_A$, G and $B_B$; the phase shifts $\Phi$ are then measured by the angle formed between the directions $\overline{IG}$ and $\overline{IB}$.

The resultant unbalance B' thus varies from $B_A + B_B$ (on starting up the vibrator shaft, the phase shift being zero and the fly weights aligned on the same side of G) to $B_A - B_B$ when the speed of rotation of the vibrator shaft is high, in principle infinity, the flyweights being aligned on each side of G. Between these extreme positions, the free flyweight $16_B$ takes up, at a given speed, a definite angular position with respect to the flyweight $16_A$.

Thus, the resultant unbalance B diminishes automatically and in a continuous manner when the speed of the vibrator shaft increases, and this is true irrespective of the direction of rotation of the vibrator shaft; in all cases, $B_A - B_B$ will naturally be chosen greater than 0.

The results are indicated in FIG. 6, on which there has been plotted, as a function of the speed or more simply of $\omega/\omega_o$:

The resultant unbalance $B$ and

The load on the bearings $C = B \times (\omega/\omega_0)^2$

It can be seen that the load C remains practically constant over an extended range of speed in the vicinity of resonance.

Preferably, but not necessarily, the bearing on which the free flyweight $16_B$ is keyed is itself eccentrically mounted on the vibrator shaft, this eccentricity being in a radial direction parallel to that of the eccentricity of the flyweight 16A and in the same direction. This arrangement is diagrammatically shown in FIG. 7 and advantageously enables the curve B to be displaced towards the increasing $\omega$, as indicated by the curve B' of FIG. 6 and therefore permits better bracketing of the advantageous zone of speed.

In the foregoing description, it has been assumed that the free flyweight $16_B$ had been started up. This starting can be effected for example by providing a lug 20 or the like on the flyweight 16A (FIG. 7), this lug ensuring a momentary drive as it passes the flyweight 16B, in a position of opposition, and therefore of minimum resulting unbalance. To this end, the flyweight $16_B$ is provided with a finger 21 which, when the unit is at rest, is diametrically opposite to the lug 20. As soon as a stable speed is reached, the free flyweight moves away from the lug 20 and takes up the position of equilibrium corresponding to the speed.

Other releasable starting means may of course be adopted; they may even be unnecessary, especially in the case where the bearing of the free flyweight is eccentric.

It may be useful to consider the operation of a vibratory machine according to the present invention to have two periods: The first period is the acceleration period during which the rotating shaft accelerates to a constant speed. Before the shaft begins to rotate, the two weights 16A and 16B are in phase because of their configuration, as shown in FIG. 7. Immediately the shaft 11 starts to turn, and more particularly after half a turn of the shaft, the lug 20 of weight 16A engages the finger 21 of weight 16B, after which the weight 16B is urged to rotate by the weight 16A and the two weights 16A and 16B are in opposite phase. The weights 16A and 16B remain in this phase opposition as long as weight 16A pushes the weight 16B, which is during the entire acceleration period.

But once the speed of rotation of shaft 11 reduces its constant value, then the acceleration period is over and the second period begins, which is a period of uniform angular velocity of the shaft 11. During this second period, the lug 20 of weight 16A is not necessarily in contact any longer with the finger 21 of weight 16B and in fact the weights 16A and 16B will seek and reach a predetermined angle relative to each other, this angle depending on such factors as internal friction and the speed of the shaft. Thus, at low speed, the weights 16A and 16B tend to be in phase, and at high speed the weights 16A and 16B tend to be in phase opposition.

FIGS. 8 and 9 illustrate a practical construction of the eccentric flyweights according to the invention.

The flyweight $16_A$ is composed of two end plates $16'_A$, $16''_A$ fixed by keys 30 in an eccentric position on the shaft 11, on each side of the flyweight $16_B$. This flyweight $16_B$ is itself an end plate carried by a ball bearing 31. There will be noted the eccentricity E of the axis A1 of this bearing 31 with respect to the axis A2 of the shaft 11.

The plates $16'_A$, $16''_A$ and $16_B$ have all similar shapes of circular quadrants, the bisecting line BS of which (FIG. 9) defines the radial direction of eccentricity.

The plates $16'_A$, $16''_A$ are fixed axially by circlets 32 engaged in grooves in the shaft 11, and thus axially retain the bearing 31 of the plate $16_B$. This latter is retained axially by rings 33 which are fixed to it and are located on each side of the bearing 31.

On the plates $16'_A$, $16''_A$ are fixed, for example by welding, plates $35'_A$, $35''_A$ which extend in a radial direction opposite to the radial direction of eccentricity BS of the said plate. These plates $35'_A$, $35''_A$ are coupled to each other by a cross brace 20' covered by an elastic sleeve 36.

In a position diagrammatically opposite to that of this cross brace, the plate $16_B$ is provided with a peripheral projection 21' intended to cooperate with the cross brace 20 solely for the starting up of the plate $16_B$ as explained above.

As soon as the starting up has been effected, the projection 21' moves away from the cross brace 20' and the plate $16_B$ is angularly displaced with respect to the plates $16'_A$, $16''_A$.

The applicants have found that in fact this phase shift was only obtained with certainty when correct coupling is established between the vibratory machine and the material to which it applies the vibrations, the ground for example, in the case of a contacting machine. By correct coupling there is meant the maintenance of contact between the vibratory machine and the ground for a sufficiently prolonged time at each vibration.

Applicants have also found that such a correct coupling could be obtained if there is applied to the vibratory machine a weight at least equal to its own weight. In other words, it is desirable preferably to associate a suspended frame with the vibratory machine, the suspended or isolated weight which is applied to this machine by the said frame being chosen to be at least equal to the weight of the vibratory machine and of the nonsuspended portions which are coupled to it.

This arrangement will be better understood by making reference now to FIG. 10, which illustrates the application of the invention to a vibrating vehicle of the type currently employed for compacting the ground.

This vehicle comprises generally a chassis 40 which bears on the ground, on the one hand through a vibratory machine 41 according to the invention, and on the other hand through a steering wheel 42.

The chassis 40 comprises an operating station 43 with steering wheel 44 to which the wheel 42 is servo-controlled and a motor 45 which drives the unbalanced shaft 46 of the vibratory machine 41, by means of a transmission of any kind, hydraulic or mechanical.

This shaft is coupled to the chassis 40 by two crossmembers 50, with the interposition of suspension and isolating buffers of rubber 51, working under shear stress.

As these crossmembers 50 are not suspended with respect to the vibratory machine, they form part of the weight of this machine.

It will be assumed that the vibratory machine 41 comprises a single drum and weighs 3 tons, including the crossmember 50, and that the distribution of the weight of the chassis on the vibratory machine 41 and the wheel 42 is in the ratio of 3 to 1. The drum of the vibratory machine can of course be constituted by a number of elementary drums carried by a single shaft.

According to the invention, it will then be appropriate to give the chassis 40 a weight of 4 tons, of which 3 tons will be applied to the vibratory machine 41 and 1 ton to the wheel 42. The total weight of the vehicle is then 7 tons.

Following another example, assuming that the vibratory machine 41 weights 1.5 tons, that the steering wheel 42 is replaced by another vibratory machine of 1.5 tons and that the distribution of the weights of these machines is effected equally, the weight of the chassis will then be 3 tons and the total weight of the vehicle will be 6 tons.

It will of course be understood that the present invention is not restricted to the compacting of ground only. In fact, a vibratory machine according to the invention can be utilized for the study of the characteristics of the ground, and in particular for the determination of the natural resonance frequency of the ground. Finally, a machine according to the invention can be employed as a hammering machine, for driving sheetpiling into the ground for example.

Generally speaking, it is possible to say that the vibratory machine according to the invention finds an application whenever it is desirable to modify the frequency of the vibrations which it generates, with a corresponding and continuous variation of the amplitude of these vibrations.

It is important to emphasize that the numerical values given above have only been given by way of indication and do not restrict the invention in any way.

What I claim is:

1. A vibratory machine of the kind comprising a vibrating body subjected to the action of a rotating vibrator shaft and adapted to carry an eccentric flyweight fixed for rotation with said shaft, in which said eccentric flyweight is associated with a second eccentric flyweight free for rotation on said vibrator shaft, so that over a predetermined range of frequencies of vibration, the geometric resultant of the effects of said two flyweights varies in a continuous manner as an inverse function of the speed of rotation of said vibrator shaft, and in which said vibratory machine is associated with a chassis adapted for coupling to said machine by suspension and isolating means, the weight of said chassis carried by said vibratory machine being at least of the same order as that of said machine.

2. A vibratory machine as claimed in claim 1, and further comprising releasable means associated with said second eccentric flyweight for starting up said flyweight in rotation.

3. A vibrating machine as claimed in claim 2, in which said releasable rotation-starting means comprise a, lug fixed for rotation with said vibrator shaft and interposed on the relative path of said second flyweight.

4. A vibratory machine as claimed in claim 1, in which said second eccentric flyweight is carried by the vibratory shaft through the intermediary of a bearing mounted eccentrically on said vibrator shaft.

5. A vibratory machine as claimed in claim 4, in which the eccentricity of said bearing carrying the second eccentric flyweight is produced in a radial direction parallel to that of the eccentricity of said first flyweight, and in the same sense.

6. A vibratory machine as claimed in claim 3, in which said lug is arranged diametrically opposite to the direction of eccentricity of said flyweight.

7. A vibratory machine as claimed in claim 1, in which said vibrating body is a drum mounted coaxially with said vibrator shaft.

8. A vibrating vehicle adapted to make contact with the ground through the intermediary of at least one vibratory machine as claimed claim 1, comprising means for compacting the ground and/or studying the characteristics of the ground.